(12) United States Patent
Iwata et al.

(10) Patent No.: US 7,367,580 B2
(45) Date of Patent: May 6, 2008

(54) STROLLER

(75) Inventors: Katsuhiro Iwata, Saitama (JP); Go Nishida, Saitama (JP)

(73) Assignee: Combi Corporation, Tokyo-To (JP)

( * ) Notice: Subject to any disclaimer, the term of this patent is extended or adjusted under 35 U.S.C. 154(b) by 118 days.

(21) Appl. No.: 11/085,190

(22) Filed: Mar. 22, 2005

(65) Prior Publication Data

US 2005/0212265 A1 Sep. 29, 2005

(30) Foreign Application Priority Data

Mar. 23, 2004 (JP) ............................. 2004-084811

(51) Int. Cl.
*B62B 7/08* (2006.01)
(52) U.S. Cl. .................... 280/642; 280/47.38
(58) Field of Classification Search ................ 280/639, 280/38, 642, 647, 648, 650, 657, 658, 47.38
See application file for complete search history.

(56) References Cited

U.S. PATENT DOCUMENTS

| | | | |
|---|---|---|---|
| 5,354,079 A * | 10/1994 | Hettenbach | 280/33.991 |
| 5,558,405 A * | 9/1996 | Ishikura et al. | 297/487 |
| 6,561,536 B2 * | 5/2003 | Suzuki | 280/642 |
| 6,877,762 B2 * | 4/2005 | Yamazaki | 280/647 |
| 6,918,608 B2 * | 7/2005 | Crisp | 280/642 |
| 7,114,743 B2 * | 10/2006 | Kassai et al. | 280/650 |

FOREIGN PATENT DOCUMENTS

| | | |
|---|---|---|
| EP | 1 002 710 A2 | 5/2000 |
| EP | 1 002 710 A3 | 5/2000 |
| EP | 1 323 613 A2 | 7/2003 |
| EP | 1 323 613 A3 | 7/2003 |
| JP | 53-034235 A | 3/1978 |
| JP | 9-277938 A | 10/1997 |
| JP | 2003-182588 A | 7/2003 |
| WO | WO-2004-097282 A1 | 11/2004 |

\* cited by examiner

*Primary Examiner*—Frank Vanaman
(74) *Attorney, Agent, or Firm*—Birch, Stewart, Kolasch & Birch, LLP (57) ABSTRACT

A stroller having a hand-push rod; a pair of right and left armrests rotatably connected to the hand-push rod; a pair of right and left front legs rotatably connected to the respective armrests; a pair of right and left rear legs rotatably connected to the respective armrests; front wheels disposed on lower ends of the respective front legs through front wheel holders; and rear wheels disposed on lower ends of the respective rear legs through rear wheel holders. At least one pair of the pair of front legs and the pair of rear legs are inclined such that a space between the front legs or the rear legs in a width direction of the stroller increases as the legs extend downward. The wheel holders disposed on at least the pair of legs are bent inward in the width direction of the stroller, so that each of the wheel holders holds, at a lower part thereof, the corresponding wheel at a position inside an axis of each of the pair of legs.

12 Claims, 11 Drawing Sheets

STROLLER

BACKGROUND OF THE INVENTION

1. Field of the Invention

The present invention relates to a foldable stroller. More particularly, it pertains to a foldable stroller having an enhanced rigidity and a reduced width.

2. Background Art

Various strollers for taking a baby out for a walk or shopping have been proposed and used. The strollers can be folded as needed for easy keeping and carrying.

When a conventional stroller is viewed from a front thereof, the legs of the stroller are perpendicular to the ground. Since such a constitution deteriorates a rigidity of the stroller, particularly in the right and left direction thereof, it is sometimes difficult to stably operate the stroller. In a so-called tri-fold stroller that has a smaller width when it is folded, a lot of pivot portions are needed, which further deteriorates the rigidity of the stroller. Although a stroller having a high rigidity is desired, such a stroller has problems in that the stroller has a heavy weight, and folding such a stroller is inconvenient because many operations are required therefor.

In view of the above problems, a stroller has been proposed, in which a pair of right and left front legs and a pair right and left rear legs are inclined such that both a space between the front legs and a space between the rear legs widen (increase) as the legs extend downward (Japanese Patent Laid-Open Publication No. 2003-182588, for example).

In a stroller disclosed in Japanese Patent Laid-Open Publication No. 2003-182588, front legs and rear legs are inclined such that spaces between the front legs and the rear legs widen as the legs extend downward. Thus, when the stroller is used, a load is applied in such a manner that the spaces between the front legs and the rear legs are widened, whereby the stroller can have an improved rigidity.

However, since the front legs and the rear legs are inclined such that the spaces between the front legs and the rear legs widen as the legs extend downward, the width of the stroller at a lower leg-end thereof is increased. Then, such problems may arise in that it is inconvenient to use the stroller in a crowded place, and that the unfolded stroller cannot go through a ticket barrier or the like.

The stroller disclosed in Japanese Patent Laid-Open Publication No. 2003-182588 has an X-shaped link disposed between the pair of front legs and the pair of rear legs. In order to fold the stroller, the X-shaped link brings the pair of front legs and the pair of rear legs close to each other toward a center of the stroller in the width direction thereof. Thus, the folded stroller is compact not only in a back and forth direction but also in a right and left (width) direction. However, in order to reduce the width of the stroller, when inclinations of the respective legs are reduced too much, the stroller cannot be folded because members of the link disposed between the pair of front legs and the pair of rear legs may contact the front legs and the rear legs.

SUMMARY OF THE INVENTION

The present invention has been made in view of the above problems. An object of the present invention is to provide a stroller having a reduced width and an enhanced rigidity.

The present invention is a stroller comprising: a hand-push rod; a pair of right and left armrests rotatably connected to the hand-push rod; a pair of right and left front legs rotatably connected to the respective armrests; a pair of right and left rear legs rotatably connected to the respective armrests; wheel holders disposed on lower ends of the respective front legs and the respective rear legs; and wheels rotatably held by the respective wheel holders; wherein at least one pair of the pair of front legs and the pair of rear legs are inclined such that a space between the legs in a width direction of the stroller increases as the legs extend downward; and the wheel holders disposed on at least the pair of legs are bent inward in the width direction of the stroller, so that each of the wheel holders holds, at a lower part thereof, the corresponding wheel at a position inside an axis of each of the pair of legs.

According to the present invention, the legs are inclined such that a space in a width direction of the stroller increases as the legs extend downward. Each of the legs holds, at a lower end thereof, the corresponding wheel at a position inside an axis of the leg in the width direction of the stroller. Thus, the width of the stroller can be reduced, while maintaining an enhanced rigidity thereof.

In the stroller, each of the inwardly bent wheel holders may includes: a leg receiving part for receiving the corresponding leg; a holding part for holding the corresponding wheel; and a connecting part for connecting the leg receiving part and the holding part, and being bent downward from the outside to the inside of the stroller in the width direction.

In the stroller, the wheels of the one pair of legs may be of a double-wheel type including an inner wheel part and an outer wheel part, and the outer wheel parts may protrude from the axes of the legs by the width of the outer wheel part on the lower end of the outer wheel.

In the stroller, the other pair of legs may be inclined such that a space between the legs in a width direction of the stroller increases as the legs extend downward.

In the stroller, the wheel holders disposed on the other pair of legs may hold the wheels at a holding part positioned on the axes of the legs.

In the stroller, the stroller may be of a foldable type and may be capable of moving between a folded state and an unfolded state, and when the stroller is in the folded state, a space between at least the one pair of the legs may substantially be constant in the vertical direction.

In the stroller, the wheel may be of a double-wheel type including an inner wheel part and outer wheel part, and a wheel shaft connecting the inner wheel part and the outer wheel part to each other, and the wheel holder may hold the wheel such that an angle formed by the wheel shaft and the corresponding leg can be varied.

In the stroller, the wheel may further have a substantially spherical shaft-supporting member which the wheel shaft passes through and is secured to, the holding part of the wheel holder may have a dent or recessed portion to be engaged with the shaft-supporting member of the wheel, and the wheel holder may hold the wheel, with the shaft-supporting member being engaged with the dent of the holding part.

In the stroller, the holding part of the wheel holder may further have a spring which is opposed to the dent to press the shaft-supporting member toward the dent.

In the stroller, the hand-push rod may be of a substantially U-shape including a pair of straight parts each extending in a substantially linear manner, and an intermediate part connecting ends of the respective straight parts, the intermediate part being capable of bending at a center portion thereof, and the stroller may be of a foldable type and may be capable of moving between a folded state and an unfolded state, and when the stroller is in the folded state, the intermediate part may be bent and a space between at least the one pair of the legs may substantially be constant in the vertical direction.

In the stroller, the wheel may be of a double-wheel type including a pair of inner wheel part and outer wheel part, and a wheel shaft connecting the inner wheel part and the outer wheel part to each other, and the wheel holder may hold the wheel such that an angle formed by the wheel shaft and the corresponding leg can be varied.

In the stroller, the wheel may be of a double-wheel type including an inner wheel part and outer wheel part, and the outer wheel part of the wheel held by the front leg may substantially be aligned with the outer wheel of the wheel held by the rear leg in a back and forth direction of the stroller.

DETAILED DESCRIPTION OF THE INVENTION

An embodiment of the present invention will be described below with reference to the accompanied drawings. FIGS. 1 to 12 show an embodiment of a foldable stroller according to the present invention.

Figure 1:
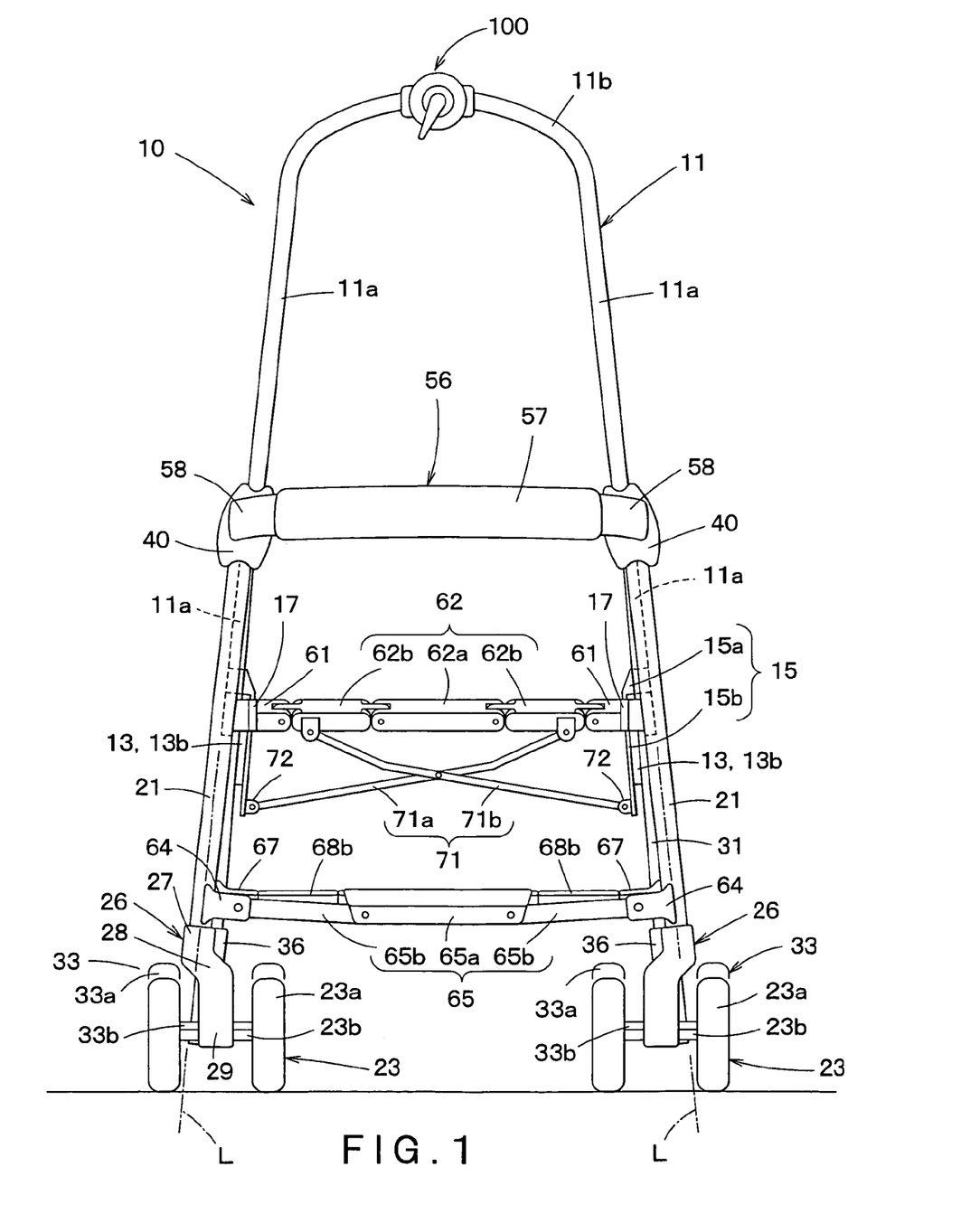
FIG. 1 is a front view of an embodiment of a stroller in an unfolded state according to the present invention.
Figure 2:
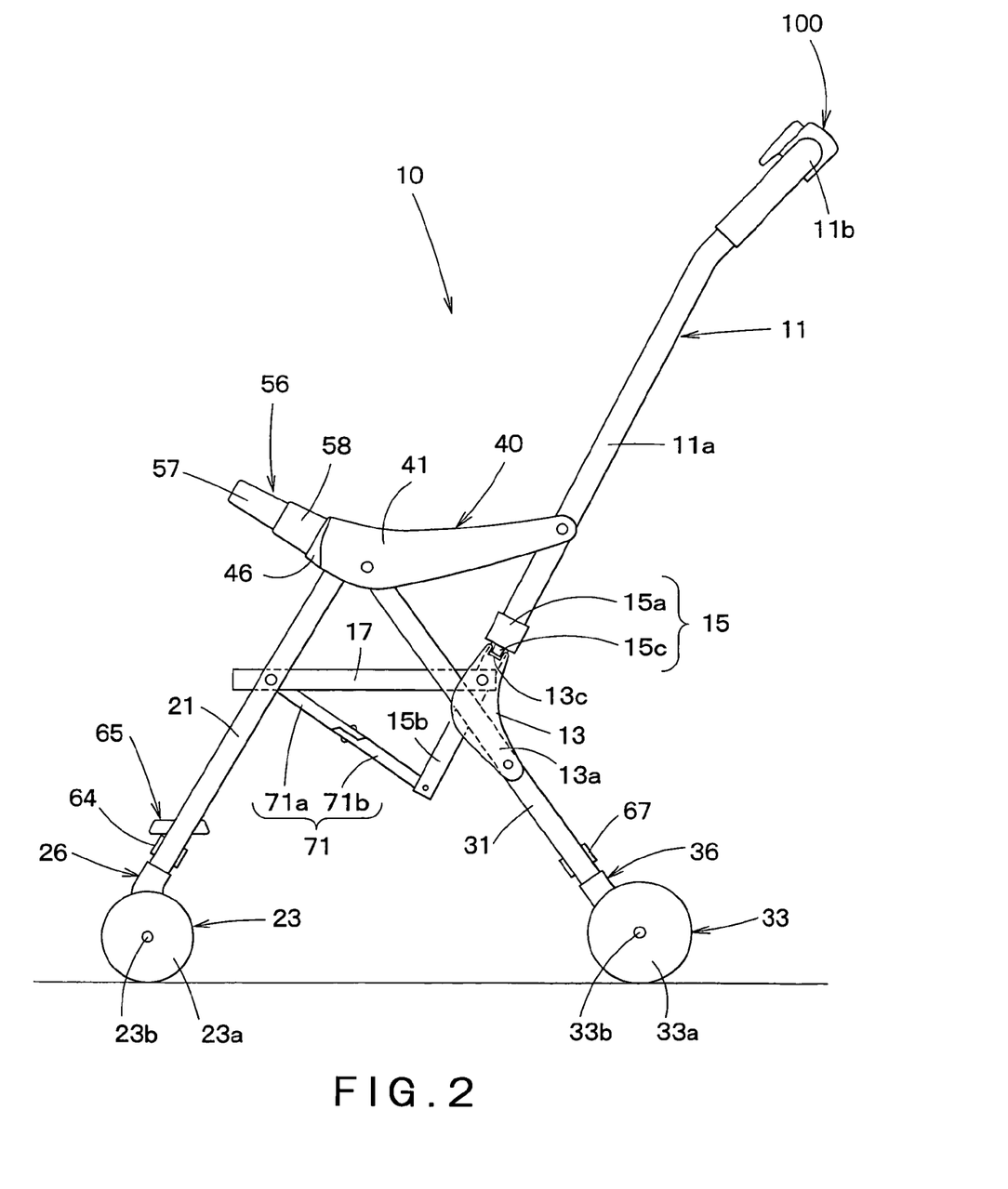
FIG. 2 is a side view of the unfolded stroller.
Figure 3:
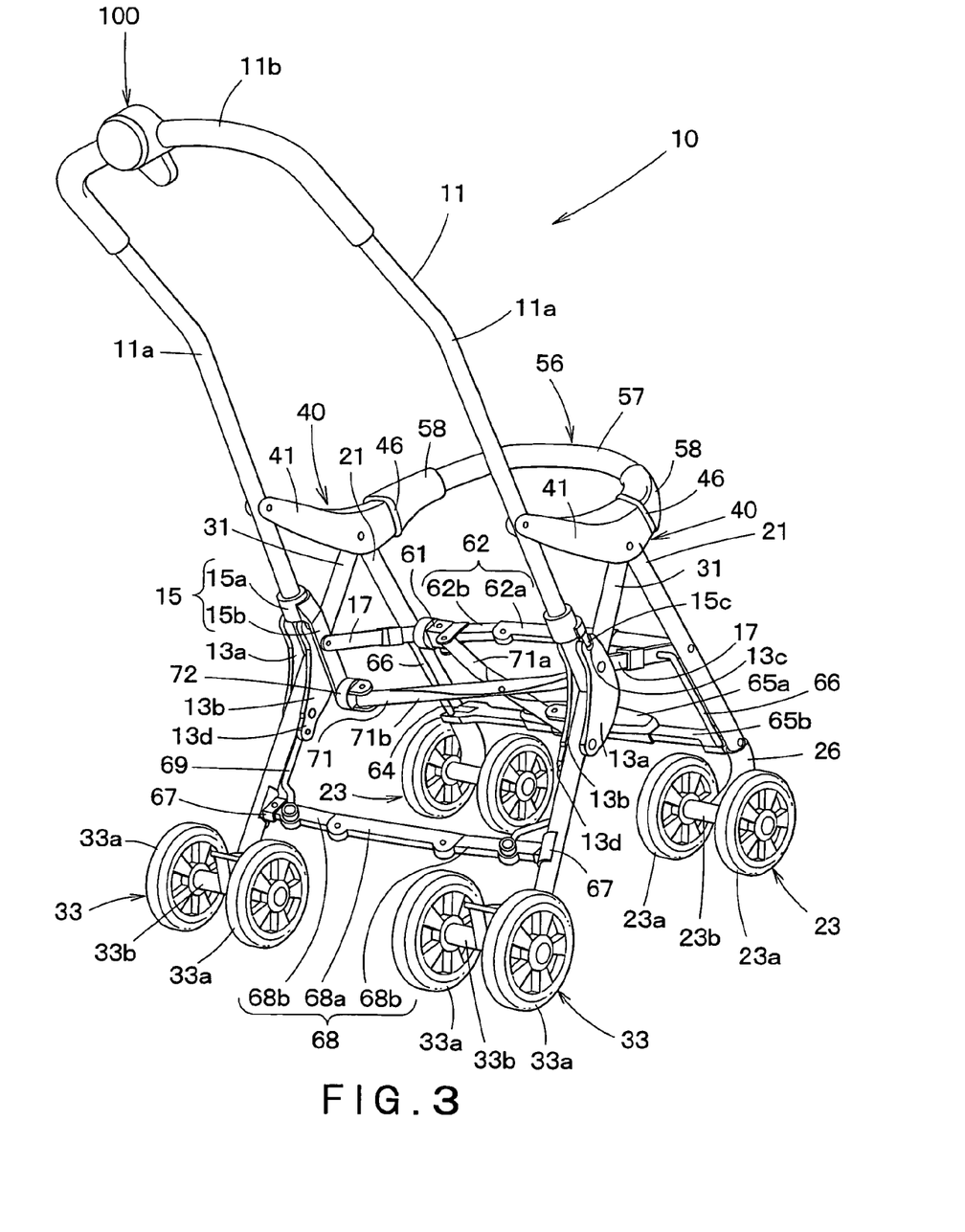
FIG. 3 is a perspective view of the unfolded stroller.
Figure 4:
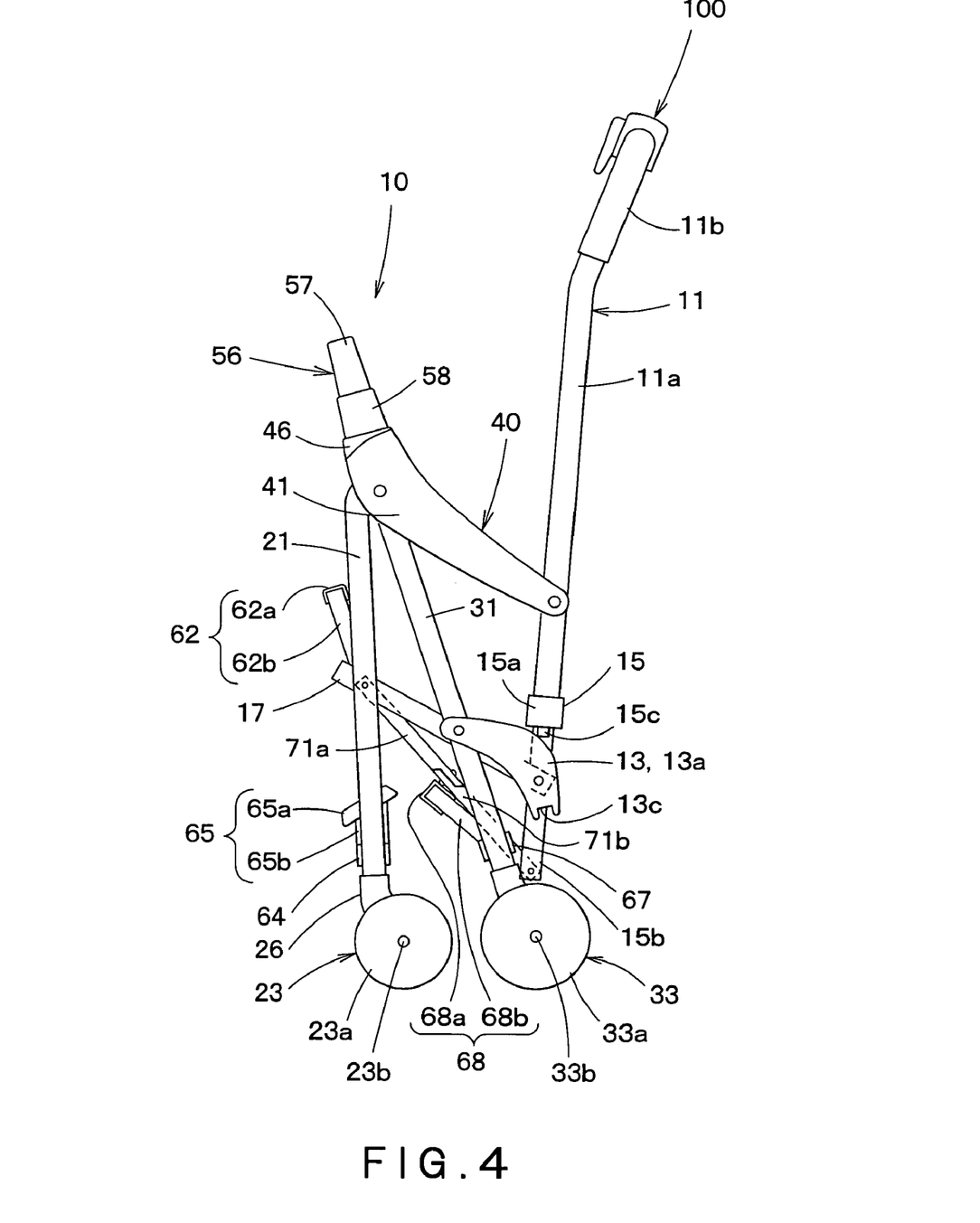
FIG. 4 is a side view of the folded stroller.
Figure 5:
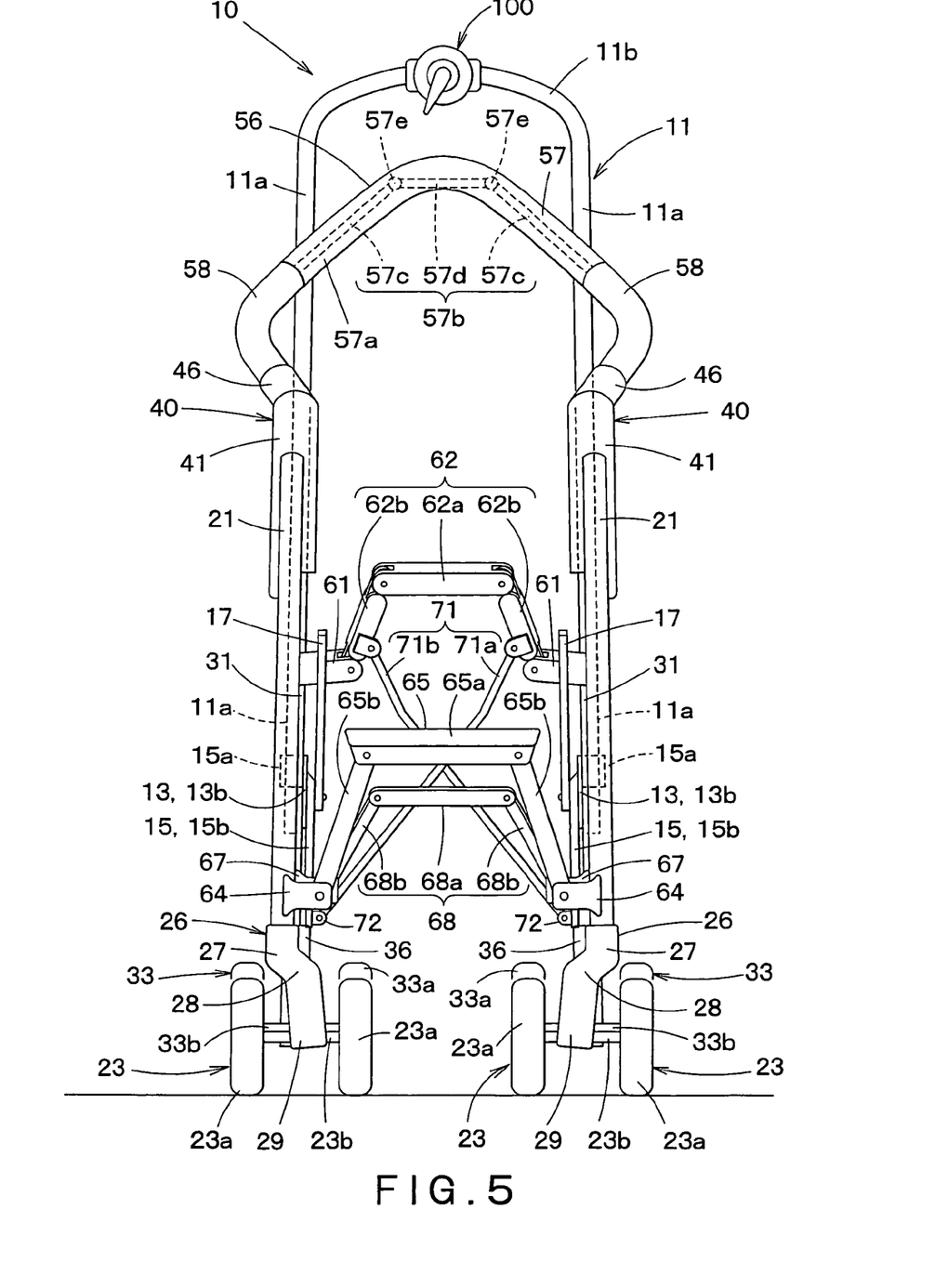
FIG. 5 is a front view of the folded stroller.
Figure 6:
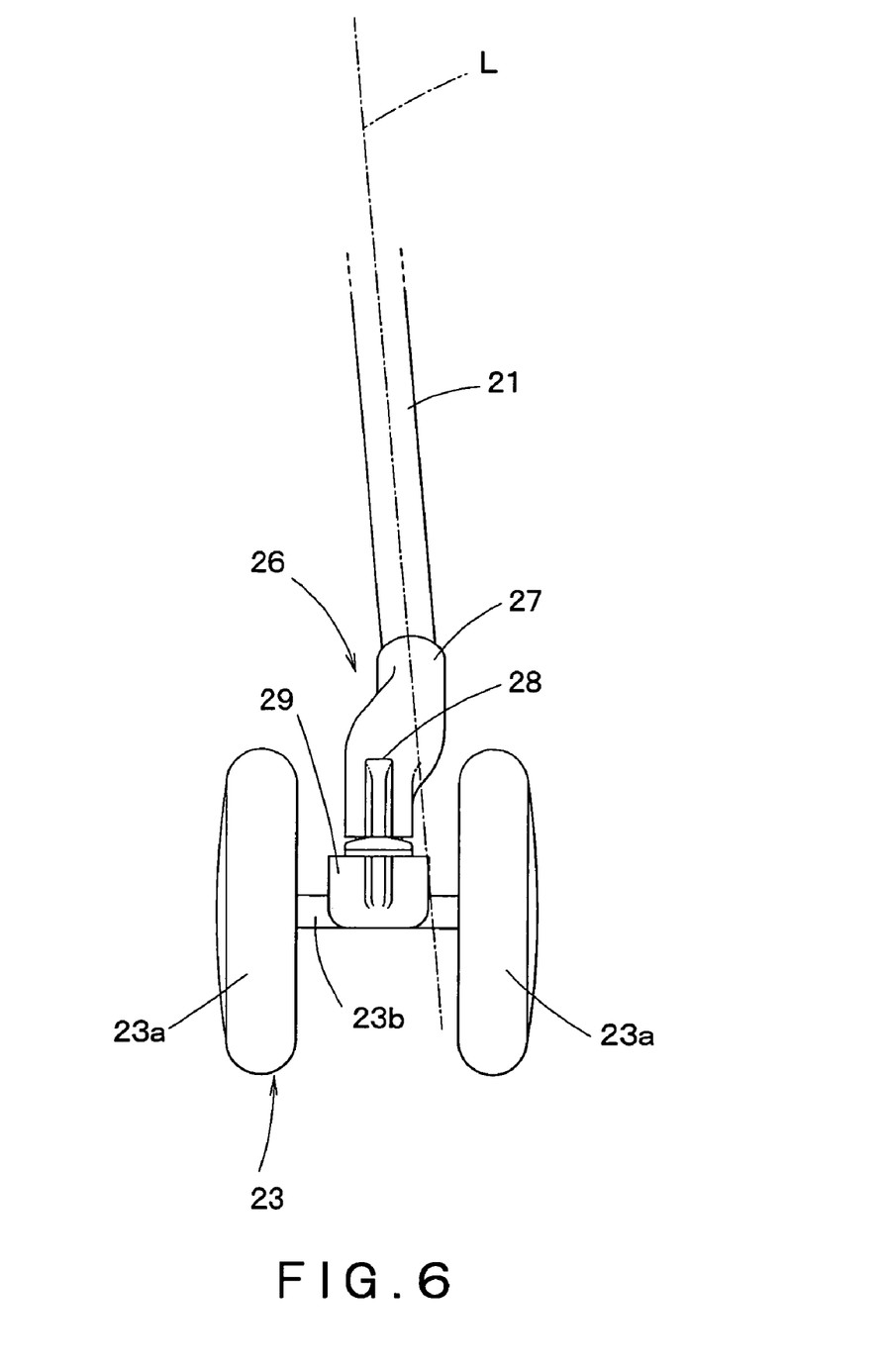
FIG. 6 is a partial front view of a front leg of the stroller.

FIG. 1 is a front view of the unfolded stroller, FIG. 2 is a side view of the unfolded stroller, FIG. 3 is a perspective view of the unfolded stroller, FIG. 4 is a side view of the folded stroller, FIG. 5 is a front view of the folded stroller, and FIG. 6 is a front view of a lower end part of a front leg of the stroller.

As shown in FIGS. 1 to 5, a stroller 10 includes: a hand-push rod 11; a pair of right and left armrests 40 rotatably connected, at each rear end thereof, to the hand-push rod 11; a pair of right and left front legs 21 rotatably connected to the respective armrests 40; a pair of right and left rear legs 31 rotatably connected to the respective armrests 40; a front wheel holder 26 disposed on a lower end of each of the front legs 21; a front wheel 23 rotatably held by the front wheel holder 26; a rear wheel holder 36 disposed on a lower end of each of the rear legs 31; and a rear wheel 33 rotatably held by the rear wheel holder 36.

At first, the hand-push rod 11 is described below. The hand-push rod 11 is of a substantially inverted U-shape, and has a pair of pipes (also referred to as "straight part") 11a and a horizontal rod part (also referred to as "intermediate part") 11b connecting the pipes 11a to each other. As shown in FIGS. 2 to 4, each of the lower ends of the respective pipes 11a of the hand-push rod 11 is rotatably connected to a bracket 13 at a position near one end of thereof. The bracket 13 is rotatably connected, at a position near the other end thereof, to an intermediate part of each of the rear legs 31.

As shown in FIG. 3, the bracket 13 has a pair of outer and inner members 13a and 13b each having a substantially V-shape. The substantially V-shaped members 13a and 13b sandwich therebetween the pipe 11a of the hand-push rod 11 and the rear leg 31. The substantially V-shaped members 13a and 13b are rotated relative to the hand-push rod 11 and the rear leg 31, with the members 13a and 13b being fixed to each other by two connection shafts passing though the hand-push rod 11 and the rear leg 31. As shown in FIGS. 2 and 3, the outer substantially V-shaped member 13a is provided with an engagement recess 13c at one end thereof. As shown in FIG. 3, the inner substantially V-shaped member 13b is provided with a projection 13d at the other end thereof.

As especially shown in FIG. 3, an extended rod 15 is attached above a position where the hand-push rod 11 and the bracket 13 are connected to each other. The extended rod 15 has an attachment portion 15a to be attached to the hand-push rod 11, and an extension portion 15b extended from the attachment portion 15a. The extension portion 15b is positioned inside the inner substantially V-shaped member 13b of the bracket 13 in the width direction of the stroller 10, and is extended downward in parallel with the pipe 11a of the hand-push rod 11. As shown in FIGS. 2 and 3, when the stroller 10 is unfolded, the attachment portion 15a of the extended rod 15 is positioned above the bracket 13 in contact therewith. The extended rod 15 is further provided with an engagement pin 15c to be engaged with the engagement recess 13c of the bracket 13.

The engagement pin 15c is urged downward by a spring (not shown) disposed in the hand-push rod 11. When the stroller 10 is unfolded, the engagement pin 15c is received in the engagement recess 13c of the bracket 13. As shown in FIG. 3, when the stroller 10 is unfolded, a lower end of the pipe 11a of the hand-push rod 11 abuts on the rear leg 31. By means of this arrangement, the hand-push rod 11, the bracket 13, and the rear legs 31 are locked in position, when the stroller 10 is unfolded.

The engagement pin 15c is connected to a locking operation mechanism 100 disposed on a center part of the horizontal rod part 11b of the hand-push rod 11 through a wire (not shown) extending in the hand-push rod 11. By operating the locking operation mechanism 100, the engagement pin 15c is retracted into the attachment portion 15a of the extended rod 15 against a spring force of the not shown spring, so as to allow the bracket 13 to be rotated relative to the hand-push rod 11.

A pair of right and left frames 17 are connected to the hand-push rod 11 such that one end of each of the frames 17 is rotatably connected to a lower end of the pipe 11a of the hand-push rod 11. In this embodiment, the frame 17 is positioned inside the extended rod 15. A rotation axis of the frame 17 relative to the hand-push rod 11 is coaxial with a rotation axis of the bracket 13 relative to the hand-push rod 11. The other end of the frame 17 is rotatably connected to an intermediate part of the front leg 21.

The hand-push rod 11 is provided with a hinge (not shown) at a center part of the horizontal rod part (intermediate part) 11b, that is, in a case of the locking operation mechanism 100. The pair of pipes 11a of the hand-push rod 11 can swing about the hinge to come close to each other. In other words, the hand-push rod 11 is bendable about the hinge.

Figure 8:
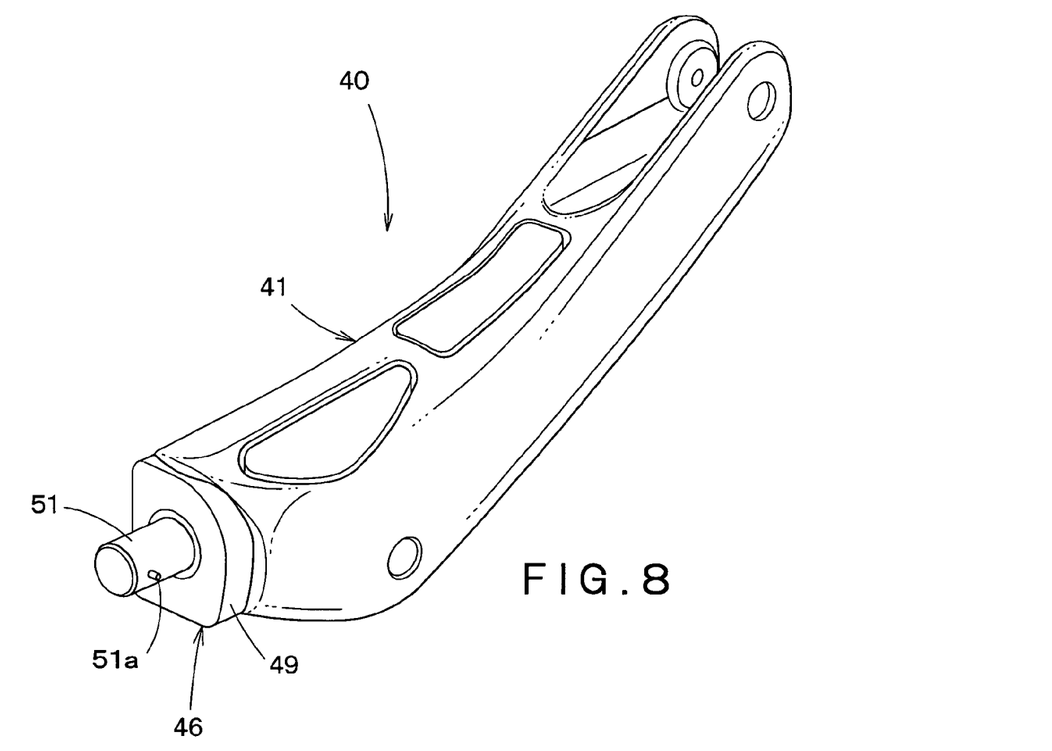
FIG. 8 is a perspective view of an armrest.
Figure 9:
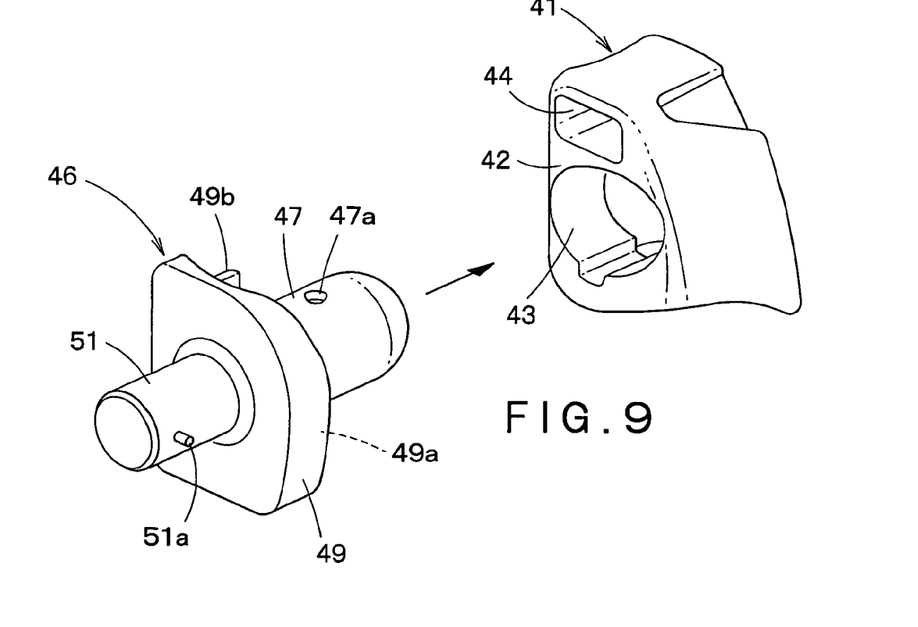
FIG. 9 is a partial exploded perspective view of the armrest.
Figure 10A:
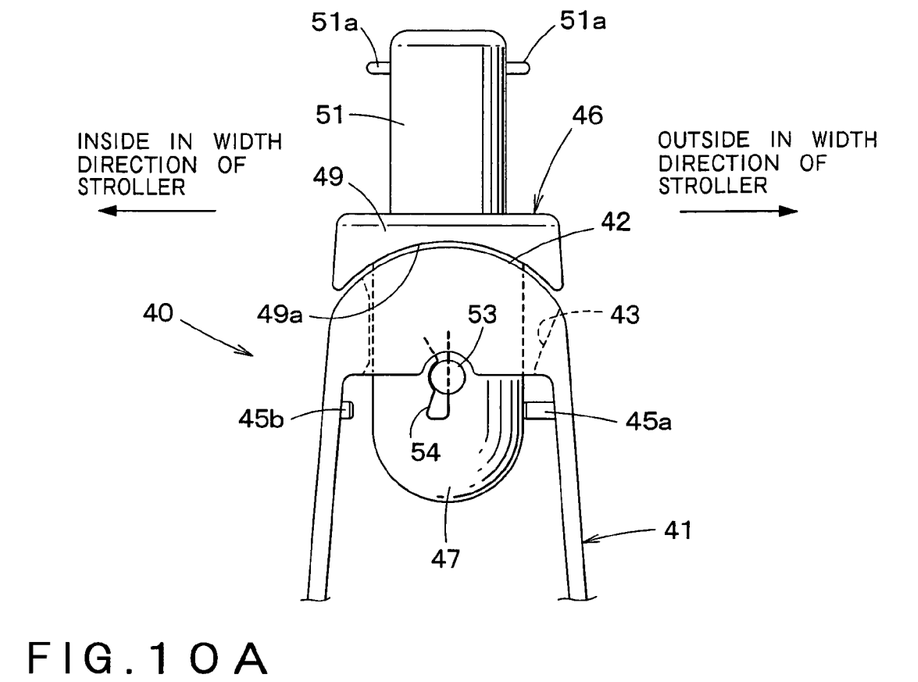
FIGS. 10A and 10B are partial bottom views of the armrest.
Figure 10B:
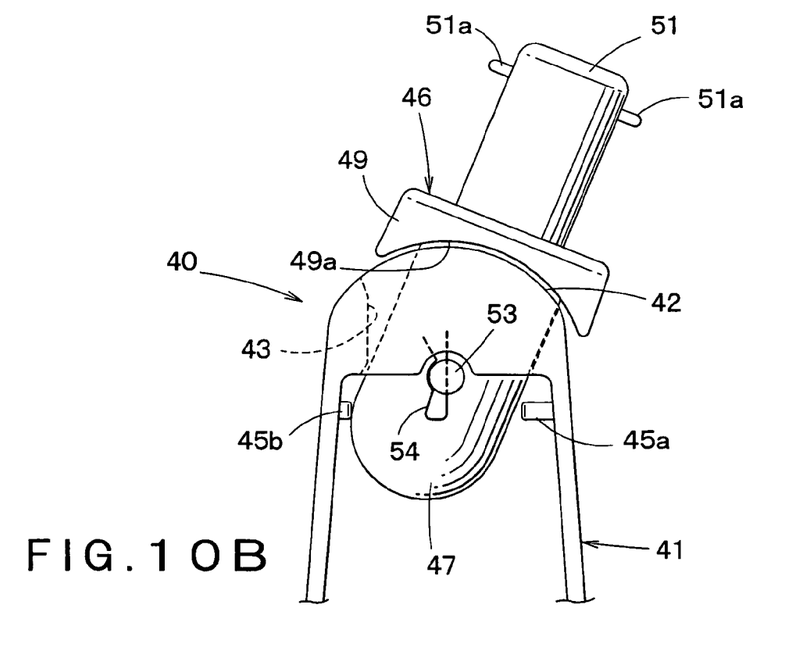
Figure 11A:
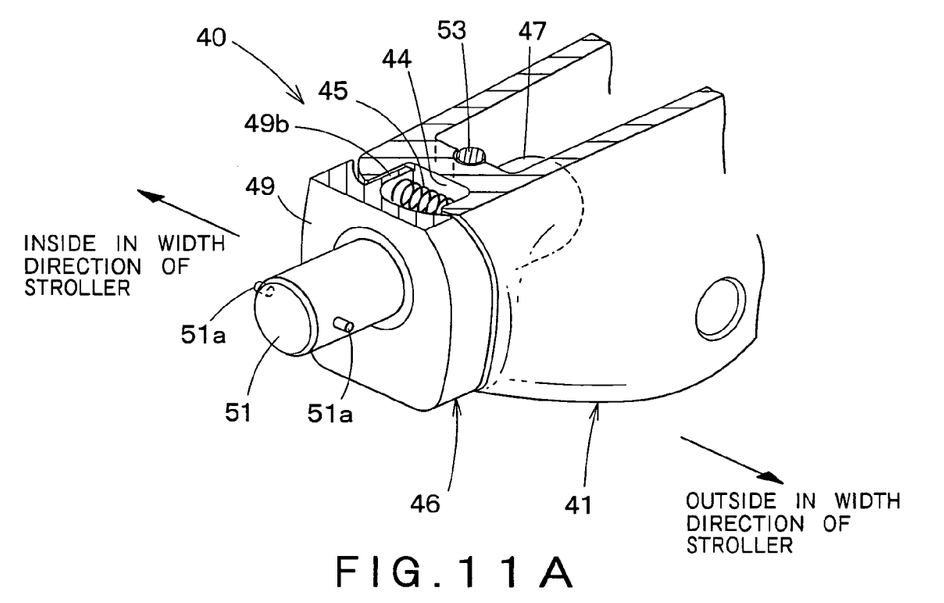
FIGS. 11A and 11B are partial sectional perspective views of the armrest.
Figure 11B:
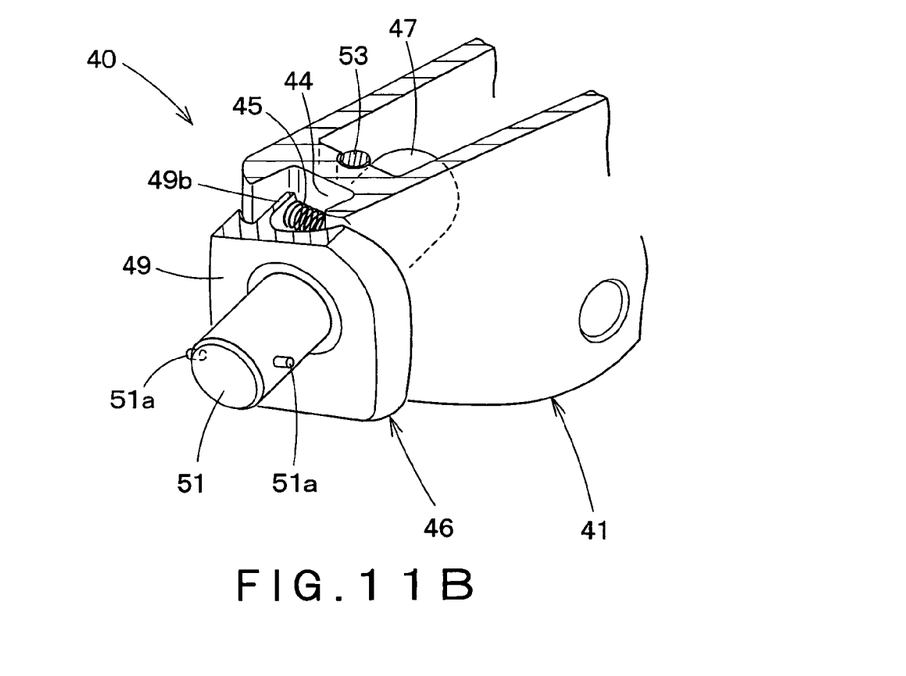

Next, the armrest 40 is described with reference to FIGS. 8 to 11. FIG. 8 is a perspective view of the armrest 40, FIG. 9 is an exploded perspective view of a distal end part of the armrest 40, FIGS. 10A and 10B are bottom views of the distal end part of the armrest 40, and FIGS. 11A and 11B are sectional perspective views of the distal end part of the armrest 40. The pair of right and left armrests 40 are symmetrically formed. The armrest 40 shown in FIGS. 8 to 11 is the right side armrest 40 when the stroller 10 is viewed from the front.

As shown in FIGS. 8 to 11, the armrest 40 has an armrest body 41 connected to the hand-push rod 11 at its rear end, and an armrest joint part 46 to which a guard arm 56 is detachably attached. The armrest joint part 46 is supported by a distal end of the armrest body 41.

As shown in FIGS. 10A, 10B, 11A, and 11B, the armrest body 41 is opened downward, excluding a front end part thereof. A front end surface 42 of the armrest 41 is curved. As shown in FIG. 9, the armrest body 41 is provided with a transversely elongated through-hole 43 disposed in substantially a center part of the front end surface 42, and a spring holder 44 formed as an opening positioned above the through-hole 43.

As especially shown in FIG. 9, the armrest joint part 46 is provided with a shaft part 47, a flange part 49, and an engagement part 51. The shaft part 47 is inserted to the through-hole 43 of the armrest body 41. The flange part 49 is engaged with the front end surface 42 to be in contact with an end face of the guard arm 56. The engagement part 51 is inserted to the guard arm 56 to lock the same.

The shaft part 47 has a cylindrical shape, with one end thereof being formed to be semispherical. The shaft part 47 is provided with a vertical hole 47a at an intermediate part thereof. A rear surface 49a of the flange part 49 is curved in correspondence to the curved front end surface 42 of the armrest 41. The rear surface 49a is provided with a rib 49b on an upper part thereof inside the width direction of the stroller 10. As shown in FIGS. 11A and 11B, the rib 49b is adapted to be received in the spring holder 44 of the armrest body 41 so as to come into contact with a spring disposed in the spring holder 44. The engagement part 51 of the armrest joint part 46 is of a cylindrical shape. The engagement part 51 has a pair of engagement projections 51a disposed on a position near a front end thereof. The engagement projections 51a are urged by a spring (not shown) disposed in the engagement part 51 to project from an outer surface thereof in the right and left direction. When the engagement projections 51a are pushed into the engagement part 51 against a spring force of the not shown spring, the engagement projections 51a can be contained in the engagement part 51.

As shown in FIGS. 10A and 10B, the shaft part 47 of the armrest joint part 46 is inserted in the through-hole 43 of the armrest body 41, with a pin 53 being inserted to the hole 47a of the shaft part 47. As shown in FIGS. 10A and 10B, the pin 53 passing through the hole 47a is engaged with a recess (not shown) formed inside the armrest body 41 so as to be arranged in position, and is fixed on the armrest body 41 by a cotter pin 54. Thus, the armrest joint part 46 can swing about the pin 53 relative to the armrest body 41 in the width direction of the stroller 10.

Inside the armrest body 41, there is provided a pair of restriction pins 45a and 45b to project from an inner surface of the armrest body 41. The right side pin 45a, in FIGS. 10A and 10B, restricts an inward swinging movement of the armrest joint part 46 in the width direction. The left side pin 45b, in FIGS. 10A and 10B, restricts an outward swinging movement of the armrest joint part 46 in the width direction.

FIG. 10A is a view showing the armrest joint part 46, when the stroller 10 is unfolded. The armrest joint part 46 is positioned substantially in front of the armrest body 41. When the armrest joint part 46 is placed in its unfolded position, the restriction pin 45a of the armrest body 41 is in contact with the shaft part 47 of the armrest joint part 46 to restrict a further inward swinging movement of the armrest joint part 46 in the width direction. That is, when the stroller 10 is unfolded, the armrest joint part 46 is positioned on the innermost side within a swinging range thereof in the width direction.

On the other hand, FIG. 10B is a view showing the armrest joint part 46, when the stroller 10 is folded. As shown in FIG. 5, the armrest joint part 46 is positioned outside the armrest body 41 in the width direction of the stroller 10. When the armrest joint part 46 is placed in its folded position, the restriction pin 45b is in contact with the shaft part 47 of the armrest joint part 46 to restrict a further outward swinging movement of the armrest joint part 46 in the width direction. That is, when the stroller 10 is folded, the armrest joint part 46 is positioned on the outermost side within the swinging range thereof in the width direction.

A compressed compression spring 45 is provided in the spring holder 44 of the armrest body 41. As shown in FIG. 11A, the compression spring 45 extends in the spring holder 44 in the width direction of the stroller 10. The rib 49b of the armrest joint part 46 abuts on an inner end of the compression spring 45 in the width direction. Thus, the armrest joint part 46 is urged by the compression spring 45 toward the unfolded position. FIG. 11A shows the armrest joint part 46 in the unfolded position, while FIG. 11B shows the armrest joint part 46 in the folded position. As shown in FIGS. 11A and 11B, the compression spring 45 is compressed in accordance with a swinging movement of the armrest joint part 46 from the unfolded position to the folded position.

The guard arm 56 is described below. As shown in FIGS. 3 and 5, the guard arm 56 has a pair of guard arm joint parts 58 to be joined to the armrests 40, and a guard arm body 57 disposed between the pair of guard arm joint parts 58.

Figure 12:
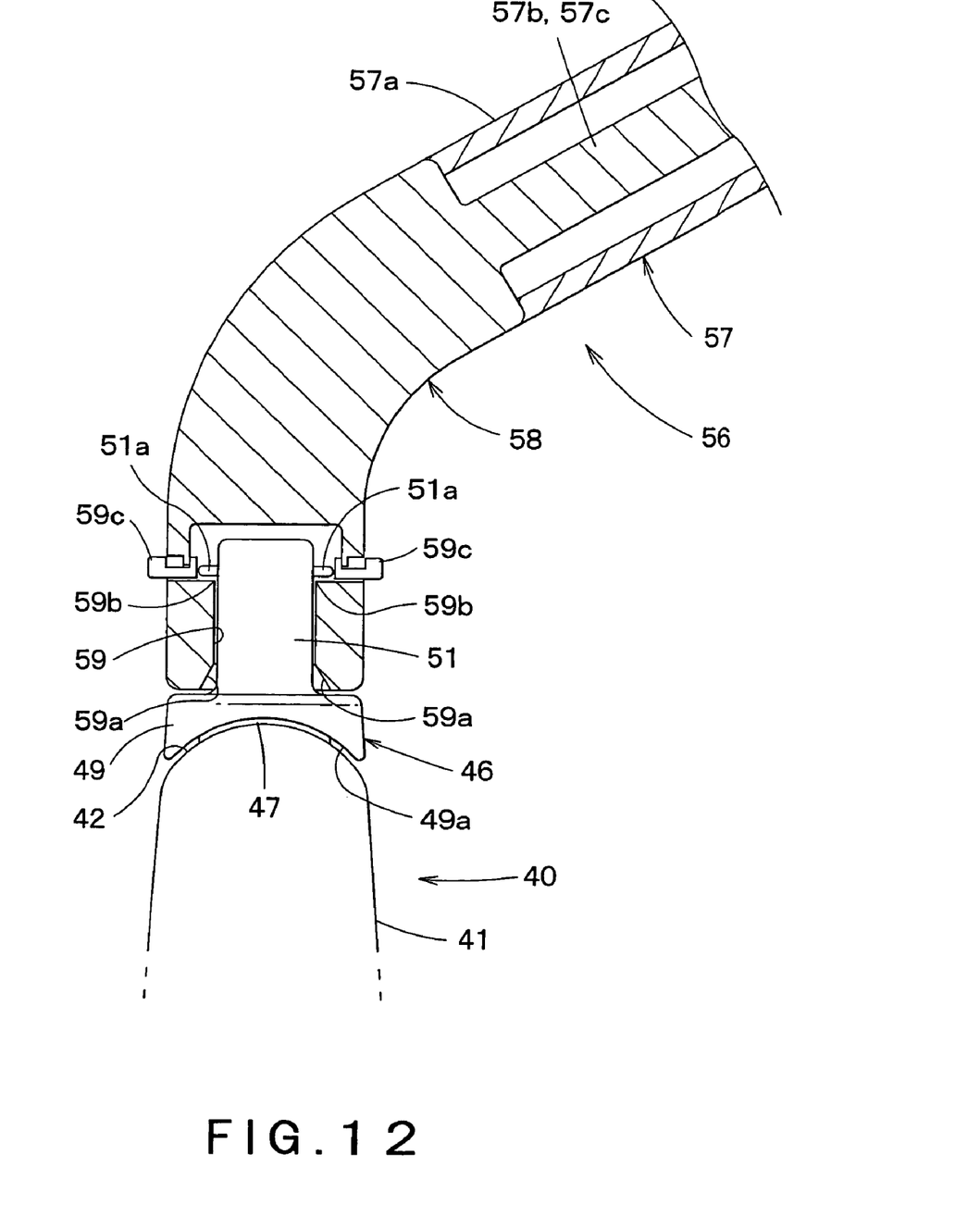
FIG. 12 is a partial sectional view of an attachment structure of a guard arm to the armrest.

FIG. 12 is a partial sectional view of an attachment structure of the guard arm 56 to the armrest 40. As shown in FIG. 12, each of the guard arm joint parts 58 has an opening 59 on its end surface facing the armrest 40. The opening 59 receives therein the engagement part 51 of the armrest joint part 46. The guard arm joint part 58 is curved inward in the width direction of the stroller 10 at a position farther from the armrest 40 than the opening 59. The opening 59 is provided with a guide part 59a on an end opening thereof, and a stage 59b near a bottom surface thereof. A diameter of the guide part 59a is enlarged outward. A diameter of the opening 59 is enlarged through the stage 59b. When the stage 59b is engaged with the engagement projections 51a of the engagement part 51, the guard arm 56 is locked in the armrest 40. The guard arm joint part 58 is provided with unlocking buttons 59c. When the engagement projections 51a are engaged with the stage 59b, the unlocking buttons 59c face distal ends of the engagement projections 51a. The unlocking buttons 59c can slide in the guard arm joint part 58 in a direction transverse to the guard arm joint part 58. Thus, by pushing the unlocking buttons 59c into the guard arm joint part 58, the engagement projections 51a are contained in the engagement part 51 against a spring force of the not shown spring.

The guard arm body 57 has a core member 57b and a guard member 57a surrounding the core member 57b. As shown in FIG. 5, the core member 57b is composed of two joints 57e and 57e disposed at substantially a center part of the core member 57b, and three guard elements 57c, 57d, and 57c which are swingably connected to each other through the joints 57e and 57e. The outside guard elements 57c and 57c are integrally formed with the pair of guard arm joint parts 58, respectively. The guard member 57a is formed of a resilient material such as rubber. When the stroller 10 is unfolded (FIG. 3, for example) the guard member 57a is not deformed (strained). Thus, the guard member 57a can be deformed by applying a force thereto, whereby the guard arm body 57 can be bent in accordance with swinging movements of the three guard elements 57c, 57d, and 57c to each other, which is shown in FIG. 5.

The front leg 21 is described in detail with reference to FIG. 1. As especially shown in FIG. 1, the pair of front legs 21 are inclined such that a space between the front legs 21 in the width direction of the stroller 10 increases as the front legs 21 extend downward, that is, the front legs 21 extend in a diverging manner as the front legs 21 extend downward. As shown in FIGS. 1 and 6, the front wheel holder 26 disposed on the lower end of each of the front legs 21 includes: a leg receiving part 27 for receiving therein the front leg 21; a holding part 29 for holding the front wheel assembly 23 at a lower part thereof; and a connecting part 28 for connecting the leg receiving part 27 and the holding part 29 to each other. The holding part 29 extends substantially perpendicular to the ground. The leg receiving part 27 extends along an axis L of the front leg 21. The connecting part 28 is bent downward such that the holding part 29 is positioned inside the leg receiving part 27 in the width direction of the stroller 10. That is, since the holding part 29 holds the front wheel 23 at a position inside the axis L of the front leg 21 in the width direction of the stroller 10, the width of the stroller 10 can be reduced.

Figure 7A:
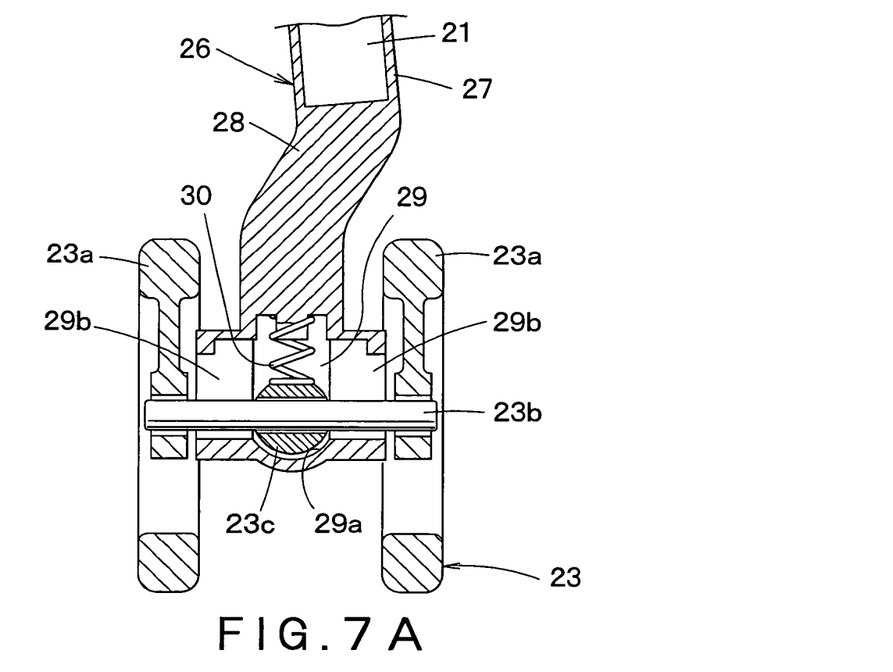
FIGS. 7A and 7B are sectional views of a wheel holder.
Figure 7B:
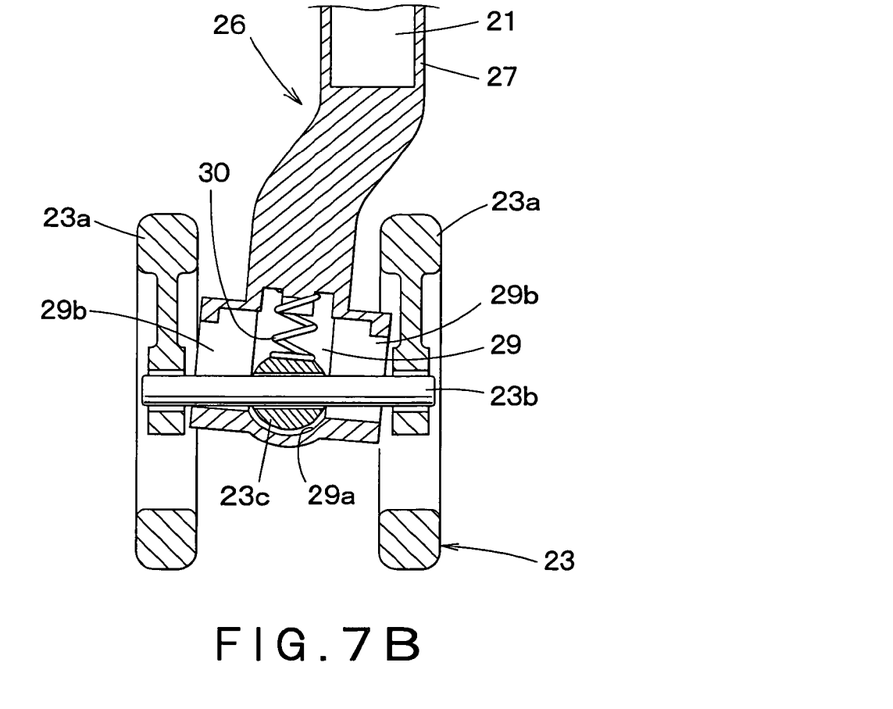

Referring to FIGS. 7A and 7B, the front wheel holder 26 is described below more in detail. FIG. 7A is a sectional view showing the front wheel holder 26 when the stroller 10 is unfolded, while FIG. 7B is a sectional view showing the front wheel holder 26 when the stroller 10 is folded.

As shown in FIG. 7A, the front wheel 23 is of a double-wheel type, and has one pair of wheel parts (an inner wheel part and an outer wheel part) 23a and 23a, and a wheel shaft 23b connecting the pair of wheel parts 23a and 23a to each other. A substantially spherical shaft-supporting member 23c is secured at a center part of the wheel shaft 23b. The holding part 29 of the front wheel holder 26 is provided with a dent or recessed portion 29a to be engaged with the shaft-supporting member 23c, and slits 29b formed on right and left sides of the dent 29a. The shaft supporting member 23c is received in the dent 29a, with being pressed toward the dent 29a by a spring 30 disposed above the shaft supporting member 23c in the holding part 29. Because of this arrangement, the front wheel 23 can be rotatably supported by the front wheel holder 26, and the wheel shaft 23b of the front wheel assembly 23 can constantly be positioned in parallel with the ground. Accordingly, as shown in FIG. 7B, even when an inclination angle of the front leg 21 relative to the ground is varied, the stroller 10 can be driven in a smooth manner.

As shown in FIG. 1, a pair of bosses 61 are disposed inside the frames 17, along a rotation axis of the front legs 21 and the frames 17. The pair of bosses 61 can be coaxially rotated with the rotation axis of the frames 17 and the front legs 21, relative to the front legs 21 and the frames 17. A front leg stay 62 is disposed between the bosses 61 to connect the same to each other. The front leg stay 62 has a center part 62a, and a pair of side parts 62b and 62b disposed on right and left sides of the center part 62a. As shown in FIGS. 4 and 5, the front leg stay 62 can be flexed at connection points of the center part 62a and the respective side parts 62b, such that the center part 62a projects upward toward the front. However, the front leg stay 62 cannot be flexed in a reverse direction.

As shown in FIG. 1, a pair of bosses 64 are disposed near the lower ends of the respective front legs 21. A footrest 65 is disposed between the bosses 64 to connect the same to each other. The footrest 65 has a footrest part 65a and a pair of side parts 65b and 65b disposed on right and left sides of the footrest part 65a. As shown in FIGS. 4 and 5, the footrest 65 can be flexed at connection points of the footrest part 65a and the respective side parts 65b, such that the footrest part 65a projects upward in coplanar with the front legs 21. However, the footrest 65 cannot be flexed downward.

As shown in FIG. 3, a connecting rod 66 is disposed between the frame 17 and the side part 65b of the footrest 65, for connecting the frame 17 and the side part 65b. An upper end of the connecting rod 66 is rotatably attached to the frame 17 at a position rearward the position where the frame 17 is connected to the front leg 21. A lower end of the connecting rod 66 is connected to the side part 65b of the footrest 65 at a position outward the position in the width direction where the side part 65b is connected to the boss 64. When the frame 17 is rotated relative to the front leg 21 to lower a rear part of the frame 17, the footrest 65 is urged by the connecting rods 66 such that the footrest part 65a projects upward.

The rear leg 31 is described more in detail below with reference to especially FIGS. 1 and 3. Similar to the front legs 21, the rear legs 31 are inclined such that a space between the rear legs 31 in the width direction of the stroller increases as the rear legs 31 extend downward, that is, the rear legs 31 extend in a diverging manner as the rear legs 31 extend downward. The rear wheel holder 36 has the same structure as that of the front wheel holder 26, excluding a connecting part thereof which is not bent. The rear wheel 33 is of a double-wheel type and has wheels 33a and 33a. A wheel shaft 33b connecting the wheels 33a and 33a to each other is constantly positioned in parallel with the ground.

As shown in FIGS. 4 and 5, a pair of bosses 67 are disposed near the lower ends of the respective rear legs 31. A rear leg stay 68 is disposed between the bosses 67 and 67 to connect the same to each other. The rear leg stay 68 has a center part 68a, and a pair of side parts 68b and 68b disposed on right and left sides of the center part 68a. The rear leg stay 68 can be flexed at connection points of the center part 68a and the respective side parts 68b, such that the front part 68a projects upward toward the front. However, the rear leg stay 68 cannot be flexed in a reverse direction.

As shown in FIG. 3, a connecting rod 69 is disposed between the inner substantially V-shaped member 13b of the bracket 13 and the side part 68b of the rear leg stay 68. An upper end of the connecting rod 69 is rotatably attached to the projection 13d of the inner substantially V-shaped member 13b of the bracket 13. A lower end of the connecting rod 69 is connected to the side part 68b of the rear leg stay 68 at a position inside the position in the width direction where the side part 68b is connected to the boss 67. When the bracket 13 is rotated relative to the rear leg 31 to raise the projection 13d, the rear leg stay 68 is urged by the connecting rod 69 such that the center part 68a projects upward.

As especially shown in FIG. 3, an X-shaped link 71 is disposed between the right and left front legs 21 and the extended rods 15 disposed at the lower ends of the hand-push rod 11. When the stroller 10 is unfolded, the X-shaped link 71 is slightly inclined rearward and downward. The X-shaped link 71 has two link elements 71a and 71b rotatably connected to each other at substantially center portions thereof.

Each rear end of the respective link elements 71a and 71b is connected to a lower end of the extension portion 15b of the extended rod 15 through a boss 72. The bosses 72 can be rotated relative to the extended rod 15 about an axis extending in substantially the width direction of the stroller 10. The link elements 71a and 71b can swing relative to the bosses 72. Each front end of the respective link elements 71a and 71b are swingably connected to the side part 62b of the front leg stay 62 at a position inward the position in the width direction where the side part 62b is connected to the boss 61. When the X-shaped link 71 is rotated to bring the respective link elements 71a and 71b close to each other toward the back and forth direction, the front leg stay 62 is urged by the X-shaped link 71 such that the center part 62a projects upward toward the front.

Effects of the present invention as constituted above will be described below.

An operation for folding the unfolded stroller 10 is described at first.

While operating the locking operation mechanism 100, the hand-push rod 11 is once raised and then pushed downward, such that the bracket 13 is rotated clockwise in FIG. 2 relative to the rear leg 31 about the connection shaft connecting the bracket 13 to the rear leg 31. In accordance with the rotation of the bracket 13 relative to the rear leg 31, the hand-push rod 11 is moved downward, and is positioned substantially in parallel with the rear leg 31.

The armrest 40 and the frame 17, which are pivotally attached to the hand-push rod 11, are rotated clockwise in FIG. 2 relative to the hand-push rod 11, so that rear parts of the armrest 40 and the frame 17 are inclined downward. That is, the front leg 21 and the hand-push rod 11 are moved to come close to each other, with the front leg 21 and the hand-push rod 11 being maintained in substantially parallel with each other. Then, as shown in FIG. 4, dimensions in the back and forth direction of the stroller 10 can be reduced.

As shown in FIGS. 2 and 4, in accordance with the rotation of the frame 17 relative to the hand-push rod 11, a length of the X-shape link 71 is enlarged, when the stroller 10 is viewed from a lateral side. That is, the respective link elements 71a and 71b are rotated relative to each other toward the back and forth direction of the stroller 10. In accordance with the rotation of the X-shaped link 71 when the stroller 10 is folded, the hand-push rod 11 connected to the X-shaped link 71 through the extended rods 15 swings (bends) by means of the not shown hinge disposed in the horizontal rod part (intermediate part) 11b, so that the pipes (straight parts) 11a of the hand-push rod 11 come close to each other to narrow a space between the lower ends thereof.

The front legs 21 and the rear legs 31, which are connected to the hand-push rod 11 through the armrests 40, swing about the not shown hinge disposed in the horizontal rod part 11b of the hand-push rod 11 so as to narrow both the space between the front legs 21 and the space between the rear legs 31 in the width direction. As a result, as shown in FIG. 5, dimensions in the width direction of the stroller 10 can be reduced.

When the X-shaped link 71 is rotated to bring the link elements 71a and 71b close to each other, the font leg stay 62 is urged by the X-shape link 71 such that the center part 62a projects upward toward the front. When the connecting rod 66 is lowered in accordance with the rotation of the frame 17, the footrest 65 is urged by the connecting rod 66 such that the footrest part 65a projects upward. When the connecting rod 69 is raised in accordance with the rotation of the bracket 13, the rear leg stay 68 is urged by the connecting rod 69 such that the center part 68a projects upward toward the front. Since the front leg stay 62 and the footrest 65 connecting the front legs 21 to each other, and the rear leg stay 68 connecting the rear legs 31 to each other are operated in the manner as described above, the front legs 21 and the rear legs 31 can smoothly come close to each other.

When the stroller 10 is unfolded, the front legs 21 and the rear legs 31 are inclined such that both the space between the front legs 21 and the space between the rear legs 31 in the width direction of the stroller 10 increase as the front legs 21 and the rear legs 31 extend downward. Thus, when the front legs 21 swing about the not shown hinge disposed in the hand-push rod 11 to narrow the space therebetween, the front legs 21 can be prevented from contacting each other. Similarly, when the rear legs 31 swing about the not shown hinge disposed in the hand-push rod 11 to narrow the space therebetween, the rear legs 31 can be prevented from contacting each other. At the same time, the front legs 21 and the rear legs 31 can be prevented from contacting the members or elements disposed between the front legs 21 and between the rear legs 31.

In order for the armrests 40 to swing about the not shown hinge disposed in the horizontal rod part 11b of the hand-push rod 11 so as to narrow a space therebetween, the guard arm body 57 must be bent into a compact size. In this embodiment, the armrest joint part 46 locking the guard arm 56 can swing from the unfolded position to the folded position relative to the armrest body 41, when folding the stroller 10. Therefore, when the stroller 10 is folded, the armrest joint part 46 is moved to the folded position by a flexing resistance of the guard arm body 57. That is, the armrest joint part 46 is pressed outward relative to the armrest body 41 in the width direction of the stroller 10. Accordingly, it is not needed for the guard arm body 57 to be bent to define a sharp curve, when the stroller 10 is folded. As a result, a resistance of the stroller 10 when it is folded can be alleviated.

Since it is not required to tightly bend the guard arm body 57 into a compact configuration, the number of joints of the core member 57b of the guard arm body 57 can be decreased, and the guard member 57a can be formed of a resilient material having a relatively high rigidity. Consequently, the guard arm 56 as a whole can have an improved rigidity, so that a baby can be protected in a more safety and secured manner.

When the stroller 10 is folded from the unfolded state, inclination angles of the front legs 21 and the rear legs 31 are varied. However, since the wheel shafts 23b and 33b of the respective front and rear wheels 23 and 33 are configured to be constantly positioned in parallel with the ground, the stroller 10 can be smoothly driven by means of the front and rear wheels 23 and 33, both in the folded and unfolded states of the stroller 10. In this embodiment, each of the front and rear wheels 22 and 33 is of a double-wheel type, which requires a precision in manufacture. However, since the front and rear wheel holders 26 and 36 are constituted as described above, the wheel shafts 23b and 33b can be constantly positioned in parallel with the ground. Accordingly, an error in manufacture can be amended, which results in an improvement in quality of the stroller 10.

On the other hand, in order to unfold the folded stroller 10, the hand-push rod 11 is raised at first. Then, the bracket 13 is rotated counterclockwise shown in FIG. 4 relative to the rear leg 31 about the connection shaft connecting the bracket 13 to the rear leg 31. Thus, the stroller 10 is unfolded as shown in FIG. 2, in accordance with the reverse operations of folding the same. When the stroller 10 is unfolded, the lower ends of the pipes 11a of the hand-push rod 11 contact the rear legs 31, with the engagement pins 15c of the extended rods 15 being engaged with the engagement recesses 13c of the brackets 13. Therefore, the hand-push rod 11, the rear leg 31, and the bracket 13 are locked in position.

As described above, the stroller 10 can be easily folded and unfolded, by raising and lowering the hand-push rod 11.

Upon unfolding of the stroller 10, the armrest joint part 46 returns to its unfolded position by means of a pushing force of the compression spring 45 to the rib 49b, and a restoring force of the guard arm body 57.

A use of the stroller 10 is describe below. In order to put a baby on the stroller 10, the guard arm 56 is once detached from the armrest 40. In order thereto, the unlocking buttons 59c of the guard arm joint part 58 are pushed, so that the engagement projections 51a of the armrest joint part 46 are received in the engagement part 51. Then, the guard arm 56 can readily be pulled out of the armrest 40.

After the baby is put on the stroller 10, the guard arm 56 is attached again to the armrest 40. When the stroller 10 is unfolded, the armrest joint part 46 is constantly urged by the compression spring 45 to be in the unfolded position, that is, the armrest joint part 46 is positioned substantially in front of the armrest body 41. Thus, it is not required for a user to adjust a position of the armrest joint part 46, or deform the guard arm body 57 so as to attach the guard arm 56 to the armrest 40. In this manner, the guard arm 56 can be easily attached to the armrest 40.

The opening 59 of the guard arm joint part 58 is provided with the guide part 59a whose diameter enlarges outward. Thus, the engagement projections 51a move along with an inclined surface of the guide part 59a so as to be received in the engagement part 51. That is, the engagement projections 51a do not interfere an insertion of the engagement part 51 to the opening 59. When the engagement projections 51a reach a part near the bottom of the opening 59 where the diameter thereof is enlarged, the engagement projections 51a project in the transverse direction by an urging force of the not shown spring, so that the engagement projections 51a are engaged with the stage 59b. Therefore, the guard arm joint part 58 is locked by the armrest joint part 46. As described above, according to this embodiment, the guard arm 56 can be readily attached to the armrest 40, simply by pushing the engagement part 51 of the armrest joint part 46 into the opening 59 of the guard arm joint part 58.

When the stroller 10 is unfolded, the front legs 21 and the rear legs 31 are inclined such that both the space between the front legs 21 and the space between the rear legs 31 in the width direction of the stroller 10 increase as the front legs 21 and the rear legs 31 extend downward. Thus, when the stroller 10 is used, a load is applied in a direction where both the front legs 21 and the rear legs 31 are widened. Accordingly, a force is applied only in a tensile direction to the front leg stay 62 connecting the pair of front legs 21 to each other, the rear leg stay 68 connecting the pair of rear legs 31 to each other, the footrest 65 connecting the pair of front legs 21 to each other, and the X-shaped link 71. Consequently, the stroller 10 can have an excellent rigidity, and can be stably operated.

The front wheel assembly 23 is held by the front wheel holder 26 at a position inside the axis L of the front leg 21 in the width direction of the stroller 10. That is, although the front legs 21 are inclined such that a space between the front legs 21 in the width direction of the stroller 10 increases as the front legs 21 extend downward, the width of the stroller 10 is prevented from being too large to handle.

In addition, the front leg stay 62 connecting the pair of front legs 21 to each other, the rear leg stay 68 connecting the pair of rear legs 31 to each other, the footrest 65 connecting the pair of front legs 21 to each other, and the X-shaped link 71 also serve as reinforcing members of a body of the stroller 10, to thereby increase a strength of the body of the stroller 10.

As described above, according to this embodiment, when the stroller 10 is unfolded, the front legs 21 and the rear legs 31 are inclined such that both the space between the front legs 21 and the space between the rear legs 31 in the width direction of the stroller 10 increase as the front legs 21 and the rear legs 31 extend downward. Thus, when the stroller 10 is used, a load is applied in a direction where both the front legs 21 and the rear legs 31 are widened. Therefore, the load is applied only in a tensile direction to the front leg stay 62, the rear leg stay 68, the footrest 65, and the X-shaped link 71. As a result, the stroller 10 can have an improved rigidity, and can be stably operated.

The front legs 21 are inclined such that a space between the front legs 21 in the width direction of the stroller 10 increases as the front legs 21 extend downward. Each of the front legs 21 holds, at the lower end thereof, the front wheel assembly 23 through the front wheel holder 26. The front wheel holder 26 is bent downward from the outside to the inside of the stroller 10 in the width direction thereof, whereby the front wheel holder 26 can hold the front wheel 23 at a position inside the axis L of the front leg 21 in the width direction. Thus, the width of the stroller 10 can be reduced.

The front legs 21 and the rear legs 31 can be inclined at larger angles such that both the space between the front legs 21 and the space between the rear legs 31 in the width direction of the stroller 10 increases as the front legs 21 and the rear legs 31 extend downward. Thus, with a use of such a wheel holder 26, a sufficient space can be secured between the front legs 21 and the rear legs 31 in which members or elements such as a link can be arranged. Further, when the stroller 10 is folded into a compact size in the width direction thereof, the front legs 21 and the rear legs 31 can be prevented from contacting the links arranged therebetween.

When the stroller 10 is folded, the armrest joint part 46 is moved to its folded position by the bending resistance of the guard arm body 57. That is, the armrest joint part 46 is pressed outward in the width direction of the stroller 10 relative to the armrest body 41. Accordingly, it is not needed for the guard arm body 57 to be bent to define a sharp curve, when the stroller 10 is folded. As a result, a resistance of the stroller 10 when it is folded can be alleviated.

Since it is not required to tightly bend the guard arm body 57 into a compact configuration, the number of joints of the core member 57b of the guard arm body 57 can be decreased, and the guard member 57a can be formed of a resilient material having a relatively high rigidity. Consequently, the guard arm 56 as a whole can have an improved rigidity, so that a baby can be protected in a more safety and secured manner.

In the unfolded state of the stroller 10, the armrest joint part 46 is constantly urged by the compression spring 45 to the unfolded position. That is, the armrest joint part 46 is constantly positioned substantially in front of the armrest body 41. Thus, it is not required for a user to adjust a position of the armrest joint part 46, or deform the guard arm body 57 so as to attach the guard arm 56 to the armrest 40. In this manner, the guard arm 56 can be easily attached to the armrest 40.

In this embodiment, both the front legs 21 and the rear legs 31 are inclined such that both the space between the front legs 21 and the space between the rear legs 31 in the width direction of the stroller 10 increase as the front legs 21 and the rear legs 31 extend downward. However, the present invention is not limited thereto, and only one pair of the pair of front legs 21 and the pair of rear legs 31 may be inclined downward.

In this embodiment, only the front wheel holder 26 is bent inward the axis L of the front leg 21 in the width direction of the stroller 10. However, the present invention is not limited thereto, and both the front wheel holder 26 and the rear wheel holder 36 may be bent inward the axis of the corresponding leg. Alternatively, only the rear wheel holder 36 may be bent inward the axis of the leg 31 in the width direction of the stroller 10.

In this embodiment, the armrest joint part 46 swings relative to the armrest body 41 in the width direction of the stroller 10. However, not limited thereto, in application to a so-called tri-fold stroller, the armrest joint part 46 may swing in the up and down direction relative to the armrest body 41.

In this embodiment, the armrest joint part 46 swings relative to the armrest body 41. However, not limited thereto, the guard arm joint part 58 may swing relative to the guard arm body 57. Alternatively, the armrest joint part 46 may swing relative to the armrest body 41,while the guard arm joint part 58 may swing relative to the guard arm body 57.

What is claimed is:

1. A stroller comprising:
a hand-push rod;
a pair of right and left armrests rotatably connected to the hand-push rod;
a pair of right and left front legs rotatably connected to the respective armrests;
a pair of right and left rear legs rotatably connected to the respective armrests;
wheel holders disposed on lower ends of the respective front legs and the respective rear legs; and
wheel assemblies rotatably held by the respective wheel holders; wherein
at least one pair of the pair of front legs and the pair of rear legs are inclined such that in a use position a space between the legs in a width direction of the stroller increases as the legs extend downward; and
the wheel holders disposed on the at least one pair of legs are bent inward in the width direction of the stroller, so that each of the wheel holders holds, at a lower part thereof, the corresponding wheel assembly at a position inside an axis of each of the pair of legs, each wheel holder including a straight portion that extends along the axis of the corresponding leg and a connection part that extends inward from the straight portion in the use position, and in the use position the space between the connection portions in the width direction of the stroller is smaller than the space between the straight portions.

2. The stroller according to claim 1, wherein each of the inwardly bent wheel holders includes:
a leg receiving part for receiving the corresponding leg in the straight portion;
a holding part for holding the corresponding wheel assembly; and
the connecting part for connecting the leg receiving part and the holding part being bent downward from the outside to the inside of the stroller in the width direction of the stroller.

3. The stroller according to claim 1, wherein
the wheel assemblies of the at least one pair of legs are a double-wheel type including an inner wheel part and an outer wheel part, and
the outer wheel parts protrude from the axes of the legs by the width of the outer wheel part on the lower end of the outer wheel.

4. The stroller according to claim 1, wherein
the other pair of legs are inclined such that a space between the legs in a width direction of the stroller increases as the legs extend downward.

5. The stroller according to claim 4, wherein
the wheel holders disposed on the other pair of legs hold the wheel assemblies at a holding part positioned on the axes of the legs.

6. The stroller according to claim 1, wherein
the stroller is of a foldable type and is capable of moving between a folded state and an unfolded state, and
when the stroller is in the folded state, a space between at least the at least one pair of legs is substantially constant in the vertical direction.

7. The stroller according to claim 6, wherein
each of the wheel assemblies is a double-wheel type including an inner wheel part and an outer wheel part, and a wheel shaft connecting the inner wheel part and the outer wheel part to each other, and
the wheel holder holds the wheel assembly such that an angle formed by the wheel shaft and the corresponding leg can be varied.

8. The stroller according to claim 7, wherein
each of the wheel assemblies further has a substantially spherical shaft-supporting member which the wheel shaft passes through and is secured to,
the holding part of the wheel holder has a recessed portion to be engaged with the shaft-supporting member of the wheel assembly, and
the wheel holder holds the wheel assembly, with the shaft-supporting member being engaged with the recessed portion of the holding part.

9. The stroller according to claim 8, wherein
the holding part of the wheel holder further has a spring which is opposed to the recessed portion to press the shaft-supporting member toward the recessed portion.

10. The stroller according to claim 1, wherein
the hand-push rod is of a substantially U-shape including a pair of straight parts each extending in a substantially linear manner, and an intermediate part connecting ends of the respective straight parts, the intermediate part being capable of bending at a center portion thereof, and
the stroller is of a foldable type and is capable of moving between a folded state and an unfolded state, and when the stroller is in the folded state, the intermediate part is bent and a space between at least the at least one pair of legs is substantially constant in the vertical direction.

11. The stroller according to claim 10, wherein
each of the wheel assemblies is a double-wheel type including an inner wheel part and an outer wheel part, and a wheel shaft connecting the inner wheel part and the outer wheel part to each other, and
the wheel holder holds the wheel assembly such that an angle formed by the wheel shaft and the corresponding leg can be varied.

12. The stroller according to claim 1, wherein
each of the wheel assemblies is a double-wheel type including an inner wheel part and an outer wheel part, and
the outer wheel part of the wheel assembly held by the front leg is substantially aligned with the outer wheel of the wheel assembly held by the rear leg in a back and forth direction of the stroller.

* * * * *